United States Patent [19]

Nagata et al.

[11] 4,415,326

[45] Nov. 15, 1983

[54] TACTILE SENSIBILITY TESTING EQUIPMENT

[75] Inventors: Saburo Nagata, Tokyo; Ken Nara, Yokohama, both of Japan

[73] Assignee: Canon Kabushiki Kaisha, Tokyo, Japan

[21] Appl. No.: 309,161

[22] Filed: Oct. 6, 1981

[30] Foreign Application Priority Data

Oct. 16, 1980 [JP] Japan ................... 55-147616

[51] Int. Cl.³ ............................................ G09B 21/00
[52] U.S. Cl. .................................. 434/113; 434/247; 116/DIG. 17
[58] Field of Search ............... 434/112, 113, 247, 258, 434/259; 40/337; 116/DIG. 17

[56] References Cited

U.S. PATENT DOCUMENTS

| | | | |
|---|---|---|---|
| 2,754,370 | 7/1956 | Gauvreau | 40/337 X |
| 3,500,556 | 3/1970 | Moskowitz | 434/259 |
| 3,775,868 | 12/1973 | Moore | 434/259 |

FOREIGN PATENT DOCUMENTS

| | | | |
|---|---|---|---|
| 48-18280 | 5/1973 | Japan . | |
| 54-38936 | 11/1979 | Japan . | |
| 54-40138 | 11/1979 | Japan . | |
| 193470 | 2/1923 | United Kingdom | 434/113 |

*Primary Examiner*—William H. Grieb
*Attorney, Agent, or Firm*—Fitzpatrick, Cella, Harper & Scinto

[57] ABSTRACT

A tactile sensibility testing equipment used for those who have a poor eyesight or the blind is disclosed. The testing equipment includes a plate member having a raised pattern formed its surface to be discriminated through the tactile sensation, a mounting member on which the plate member is detachably mounted and a supporting member for rotatably supporting the mounting member. Various patterns can be provided and exchangeably used to test and train the blind or those who have a poor eyesight for tactile sensibility according to their tactual ability.

10 Claims, 28 Drawing Figures

TACTILE SENSIBILITY TESTING EQUIPMENT

BACKGROUND OF THE INVENTION

1. Field of the Invention

The present invention relates to a tactile sensibility testing equipment useful for testing and/or training the visually handicapped persons for tactile sensibility.

2. Description of the Prior Art

A character learning equipment for the blind is disclosed in Japanese Official Gazette of Utility Model Patent No. Sho 48-18280. This prior art character learning equipment for the blind uses raised characters in hiragana type, katakana type, etc. Also, Japanese Official Gazette of Utility Model Patent No. Sho 54-40138 has disclosed a shape teaching equipment for the blind. In this equipment, animals and other objects are represented in a form of a relief pattern tangible to the blind.

These prior art equipments for the blind have been proposed to attain the same purpose. The purpose is to teach the visually handicapped persons the shapes of characters and objects as they are. Therefore, these teaching and learning equipments are unsuitable for synthetically examining the tactile sensibility of the visually handicapped.

On the other hand, reading equipments for the blind have been proposed and lately put to practical use. The reading equipment for the blind most widely accepted at present is of the type disclosed in Japanese Official Gazette of Patent No. Sho 54-38936. However, to get skilled in reading using a type of reading equipment, the visually handicapped person who wishes to enjoy the reading equipment has to be trained for keen tactual perception by finger. This is particularly true when he wishes to efficiently read complicated figures and characters by finger. For this purpose, it is essential to improve his tactual resolving power in every direction of taction. Such an improvement in tactile sensibility can be attained only by a particular training.

SUMMARY OF THE INVENTION

Accordingly, it is an object of the invention to provide a tactile sensibility testing equipment useful for examining the visually handicapped persons in their ability to discriminate information through tactile sensation and also useful for improving their ability to read information through tactile sensation.

It is another object of the invention to provide a tactile sensibility testing equipment which is very simple in structure, permits one to easily conduct a tactile perception test and provides training for improving ones ability to read information through tactile sensation.

Other and further objects, features and advantages of the invention will appear more fully from the following description taken in connection with the accompanying drawings.

DESCRIPTION OF PREFERRED EMBODIMENTS

Figure 1:
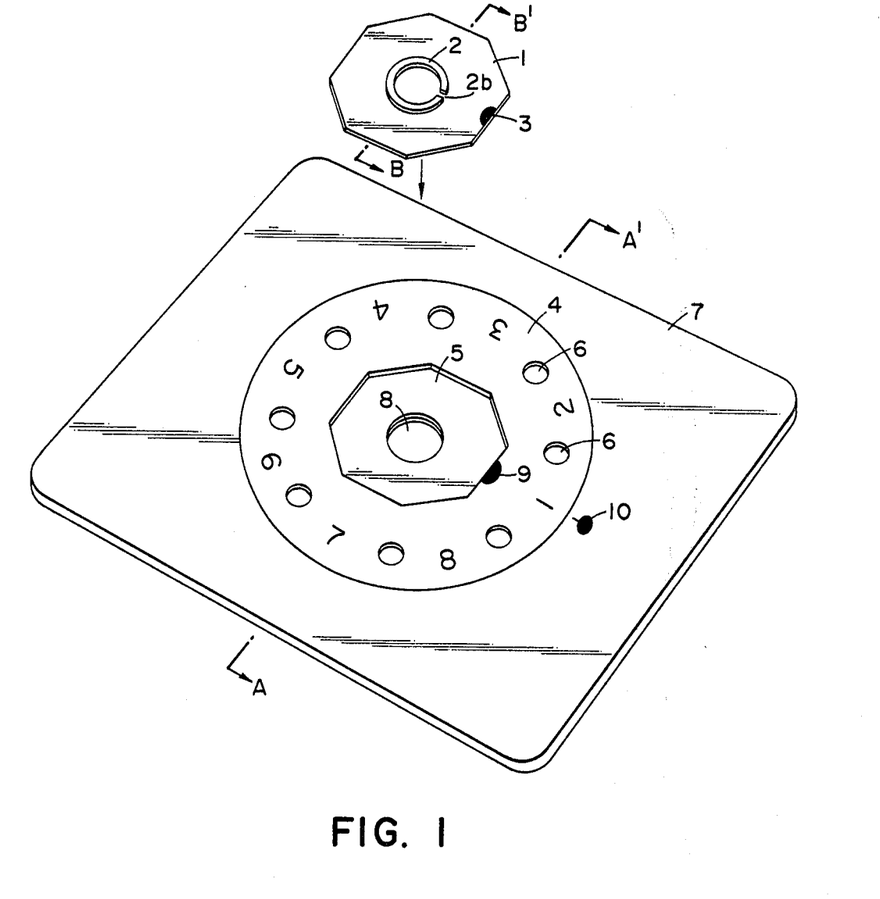
FIG. 1 is a perspective view of a tactile sensibility testing and training equipment showing an embodiment of the present invention.
Figure 2:
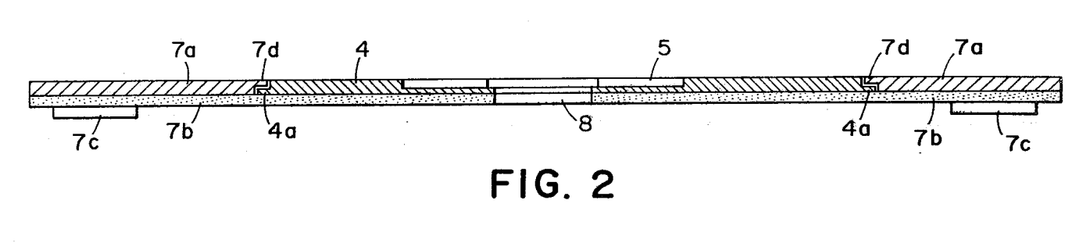
FIG. 2 is a cross sectional view taken along the line A—A′ in FIG. 1.

FIGS. 1 and 2 show an embodiment of the tactile sensibility testing and training equipment according to the present invention.

Designated by 1 is a tangible pattern member which is, in the shown embodiment, a regular octagonal plate having a raised pattern portion 2 and a mark 3. 4 is a mounting member having a recessed portion 5 in which the tangible pattern member is to be fitted. 7 is a supporting base for rotatably supporting the mounting member 4. A hole 8 passes through the supporting base and the mounting member at the center of the assembly. This pass-through hole 8 facilitates the demounting of the tangible pattern member 1 from the mounting member 4. After the pattern member 1 has once been fitted into the recessed portion 5 of the mounting member 4, one can easily detach the pattern member 1 from the mounting member 4 by pushing it out with his finger through the hole 8 from the backside of the supporting base 7.

The supporting base 7 is composed of three portions, that is, upper portion 7a, lower portion 7b and leg portion 7c. The upper portion 7a and lower portion 7b and also the lower portion 7b and the leg portion 7c are bonded together by means of adhesive.

The mounting member 4 has a marginal projection 4a sandwiched in between the lower portion 7b and an inner projection 7d of the supporting base 7. Since the marginal projection 4a of the mounting member 4 is disposed slightly spaced from the inner projection 7d of the supporting base 7 as seen best in FIG. 2, one can rotate the mounting member 4 clockwise or counterclockwise by his finger engaged in any one of finger holes 6 provided on the mounting member. The finger holes 6 are circumferentially arranged at regular intervals.

Figure 3:
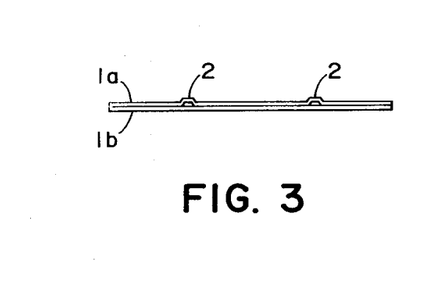
FIG. 3 is a cross sectional view taken along the line B—B′ in FIG. 1.
Figure 4:
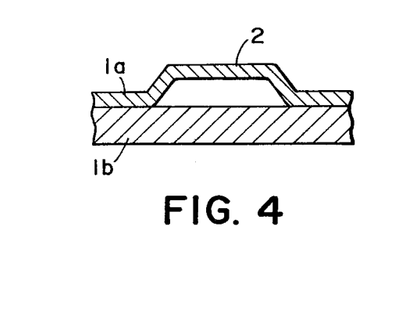
FIG. 4 is an enlarged view of the raised portion 2 shown in FIG. 3.
Figure 5A:
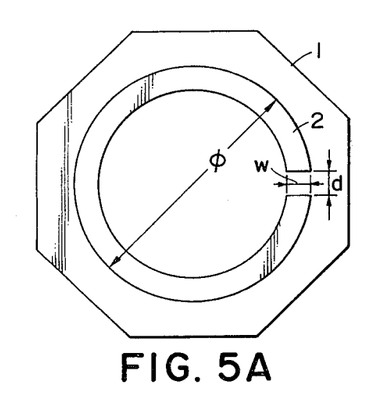
FIGS. 5A to 5L shows, in plane view, examples of a tangible pattern member having a raised portion in the form of Landolt's ring with, the Landolt's rings in each of the examples (a) to (l) being different in size with respect to each other.
Figure 5B:
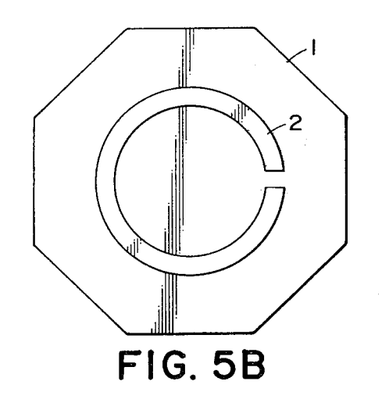
Figure 5C:
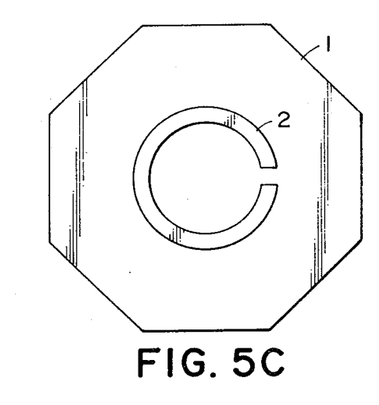
Figure 5D:
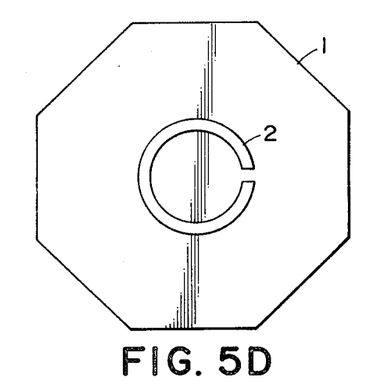
Figure 5E:
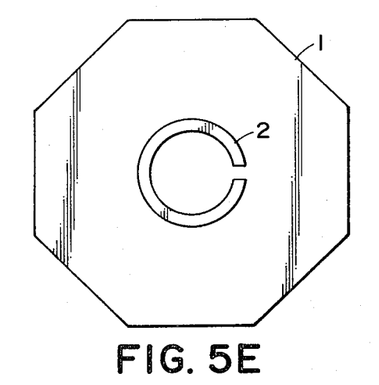
Figure 5F:
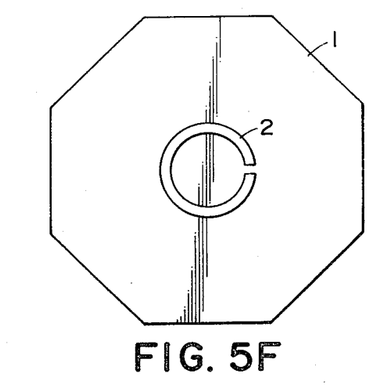
Figure 5G:
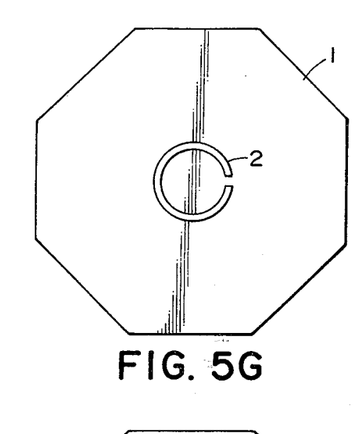
Figure 5H:
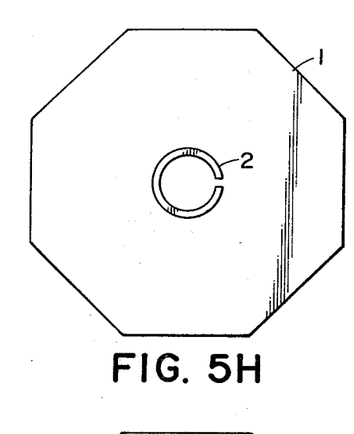
Figure 5I:
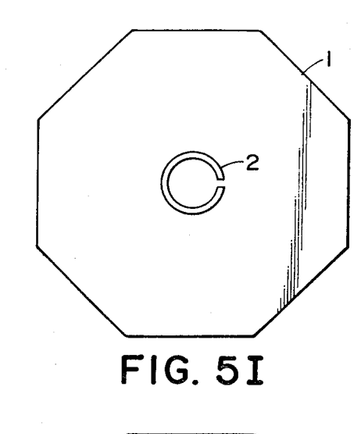
Figure 5J:
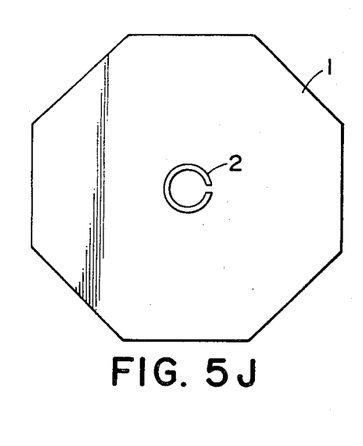
Figure 5K:
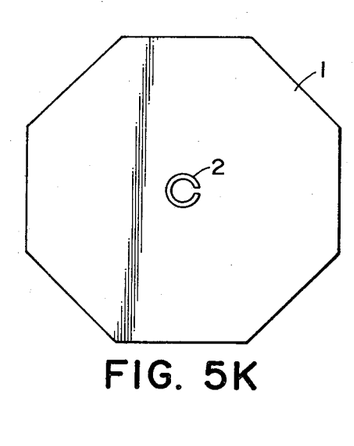
Figure 5L:
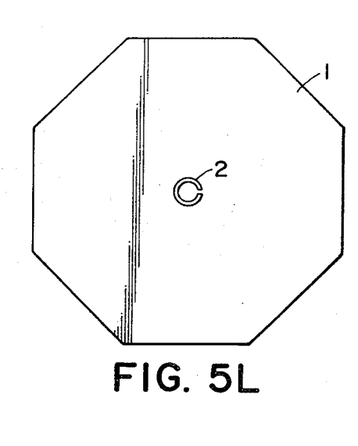

FIG. 3 is a cross sectional view of the tangible pattern member 1 and FIG. 4 is an enlarged view of the raised pattern portion 2 thereof.

The raised portion 2 has a height of 0.6 mm from the surface of the member 1. In case of braille, it has been known in the art that the height of a braille raised point most preferable for finger reading is 0.5 mm. For example, reference is made to Table 6 on page 240 of "SHOKKAKU NO SEKAI (The World of Tactual Sense)" by Kyojhi Koyanagi (published by KOSEI-KAN in Japan). However, we, the inventors of the present invention, considered that for a continuous raised pattern as in the case of the raised pattern portion 2 in this embodiment, the most suitable height for finger reading might be different from that for the conventional braille type and we conducted a number of experiments. The result of our experiments showed that the blind can most easily discriminate a continuous raised pattern through tactual sense when it has a height of 0.6 mm. Practically, the height may be in the range of 0.5 to 0.7 mm.

The tangible pattern member 1 is constituted of a plane celluloid substrate 1b and an aluminum plate 1a having the raised portion 2 formed thereof. As the aluminum plate 1a, we used an aluminum plate whose surface was subjected to a roughing treatment. When this surface material was used, there was observed that almost no sweating occurred on the fingers which touched the tangible pattern member 1 for finger reading, even after a prolonged training. Before selecting this surface material, we have also conducted a great number of experiments on the following various materials:

1. Relief printing zinc plate coated with photo resist material;
2. The same zinc plate as above, but subjected to a halftone screen point treatment;
3. A plate made of resin;
4. A plate material prepared by coating a base material with a foamable ink and then forming it by heat;
5. Molded paper; and
6. Molded silicone rubber.

Based on the experiments, a great deal of sweating was observed in all of the cases of the above listed materials. Further, it has been found that the above six materials are not preferred and that the preferred material is aluminum plate having a roughed surface.

In the shown embodiment, the raised pattern portion 2 is in the form of a Landolt's ring which provides a rotation asymmetric pattern and, as well-known, is usually used for eyesight test. Twelve Landolt's ring patterns having different sizes are prepared as shown in FIGS. 5(A) to (L). These Landolt's rings are measured as follows:

The diameter $\phi$:
(a) 50 mm, (b) 40 mm, (c) 30 mm, (d) 25 mm, (e) 22.5 mm, (f) 20.0 mm, (g) 17.5 mm, (h) 15 mm, (i) 12.5 mm, (j) 10.0 mm, (k) 7.5 mm and (l) 5.0 mm The open space d:
(a) 5.0 mm, (b) 4.0 mm ... (l) 0.5 mm.

The width w of the raised portion 2 is equal to the open space d for every ring.

As will be understood from the above, the ratio of open space d (=width w): diameter $\phi$ is always 1:10. We determined this ratio experimentally. We have experimentally found that when the ring pattern was designed using this ratio, those who have a keen tactual sense could discriminate the pattern but those who have a dull tactual sense could not discriminate it. In other words, the ratio of 1:10 is a threshold value. Therefore, this ratio is most preferred. In this connection it should be noted that in the case of Landolt's ring commonly used for eyesight test, the ratio is 1:5.

The manner of testing or training with the above equipment will be described in detail hereinafter.

At first, the examiner or trainer (hereinafter referred to simply as the examiner) mounts the tangible pattern member 1 on the mounting member 4. This is accomplished in simple manner by fitting the pattern member 1 in the recessed portion 5 of the mounting member 4 while aligning the mark 3 with the mark 9. After mounting, the examiner puts his finger in any one of the finger holes 6 and rotates the mounting member 4 together with the pattern member 1 until any desired number marked on the mounting member 4 comes in alignment with the mark 10 on the supporting base 7. In this position, the examiner stops rotating the mounting member and lets it stand still. Then, the visually handicapped person to be tested or trained (hereinafter referred to simply as the subject person) touches the pattern member 1 with fingers to know the position of the open portion 2b of the ring pattern by touch. When the subject person finds out the position, he shows the direction to the examiner. The examiner further rotates the mounting member 4 to another position and again let the subject person touch the ring pattern. In this manner, the examiner continues testing or training of the subject person while rotating the mounting member to various positions. After completing the testing or training with the first pattern member, the examiner pushes the pattern member up from the bottom through the pass-through hole 8 to demount it from the mounting member 4. The first pattern member is exchanged with the next one and the examiner further continues the testing or training in the same manner as above. To make sure that the mounting member 4 surely stands still at a given position relative to the supporting base 7, a click mechanism may be provided if necessary.

As will be readily understood from the above embodiment, the present invention brings forth many advantages.

The subject person can palpate the same raised pattern in many different directions. This makes it easy to test and/or train the tactile sensibility in many different directions.

Various tangible patterns can be exchangeably used. This makes it possible to test and/or train the tactile sensibility stepwise from an easy pattern to a difficult pattern.

When the tangible pattern members are designed in accordance with the disclosure in the above embodiment with respect to the surface material, the height of raised portion etc., the test can be carried out with greater precision. Furthermore, the training can be executed with less fatigue.

FIGS. 6 to 9 show other examples of a tangible pattern member used in the invention. In all the examples, the tangible pattern member is designated by 1 and the various portions within member 1 indicates the raised portion which corresponds, in function and structure, to the raised portion 2 shown in FIG. 4.

Figure 6A:
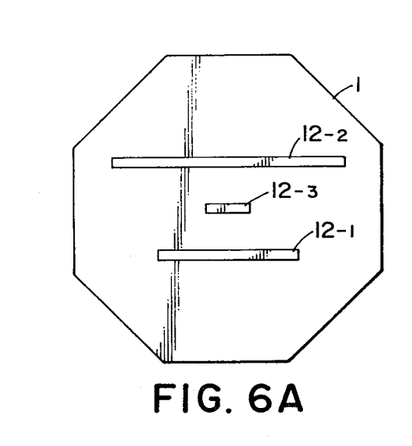
FIGS 6A to 6C, 7A to 7C, 8A to 8C and 9A to 9C, show, in plane view, other tangible pattern members having different patterns.
Figure 6B:
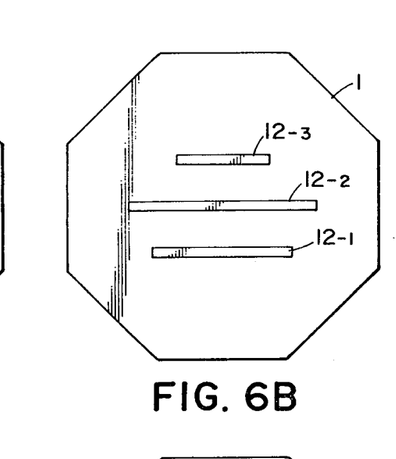
Figure 6C:
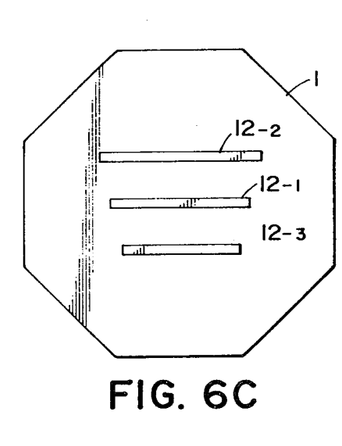

In the embodiment shown in FIG. 6, the pattern is in linear form and includes three raised lines, reference line 12-1 (30 mm long), longer line 12-2 and shorter line 12-3. This pattern is intended to be used to conduct testing and training of the subject person for tactual ability to discriminate the difference in length.

Three or more similar pattern members may be prepared as shown in FIGS. 6(a), (b) and (c). In the case of example (a), the longer line 12-2 is 20 mm longer than the reference line 12-1, and the shorter line 12-3 is 20 mm shorter than the reference line. In the case of example (b), the longer line is 10 mm longer than the reference line and the shorter line is 10 mm shorter than the reference line. In example (c), the difference in length is 5 mm. The arrangement of the reference line, longer line and shorter line is random for every example.

Figures 7A, 7B:
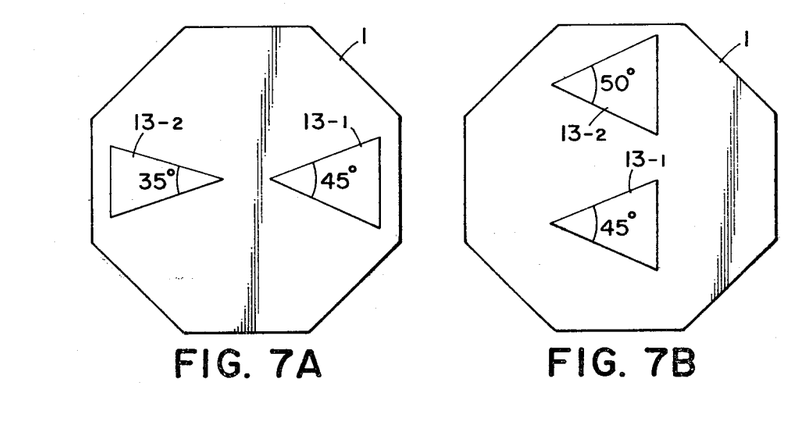
Figure 7C:
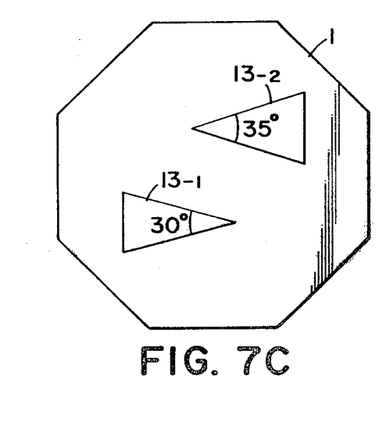

The pattern in triangular form shown in FIG. 7 is intended to be used for testing and/or training the subject person for tactual ability to discriminate the difference in angle.

Two triangular raised portions 13-1 (reference) and 13-2 are provided on every pattern member 1. In the case of example (a), the reference angle is 45° and the other angle is 35°. In example (b), the reference angle is 45° and the other angle is 50°. In example (c), the reference angle is 30° and the other angle is 35°. Many similar pattern members may be prepared by suitably selecting the angle of reference and the difference in angle between reference angle and another angle, for example, ±20°, 10°, 5°, 4°, 3°, 2°, 1° etc. In this manner, it is possible to use various angles for testing and training the tactile sensibility of the subject person to select an angle.

Figure 8A:
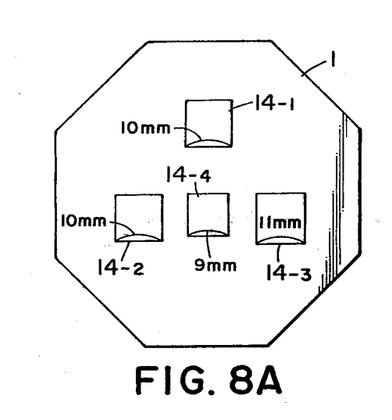
Figure 8B:
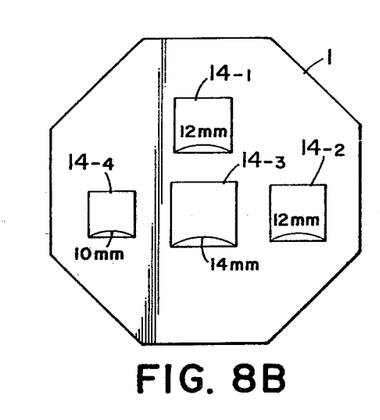
Figure 8C:
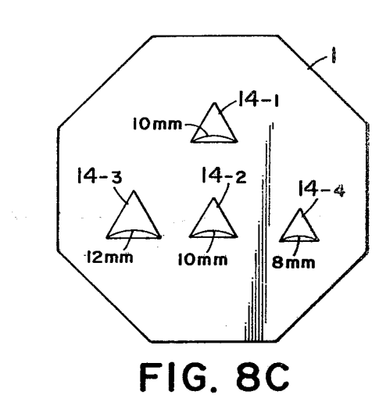

The embodiment of tangible pattern member shown in FIG. 8 is useful for testing and/or training the subject person for tactile ability to discriminate the difference in size between similar patterns.

The pattern formed on the member 1 includes four raised pattern portions 14-1, 14-2, 14-3 and 14-4. The raised portion 14-1 is a reference pattern portion. The raised portion 14-2 is the same as the reference portion 14-1 in shape as well as in size. The raised portion 14-3 is the same as the reference portion in shape but larger in size than the latter. The raised portion 14-4 is the same as the reference portion in shape but smaller in size than the latter. The tactile sensibility of the subject person is determined by whether or not the subject person can find out the pattern portion the size of which is equal to that of the reference pattern portion. The three portions other than the reference portion are arranged at random as shown in FIGS. 8(a) to (c). In examples (a) and (b), the shape of every pattern portion is square whereas in example (c) the shape is regular triangle. Other shapes and other differences in size may be used for the same purpose.

While in the above embodiments shown in FIGS. 6 to 8 there have been provided two or more pattern portions for comparison, only one pattern may be provided on one pattern member to conduct a training for absolute tactile sensibility.

Figure 9A:
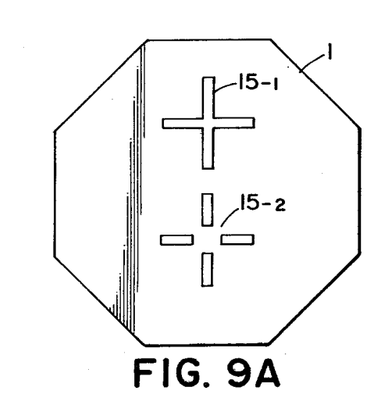
Figure 9B:
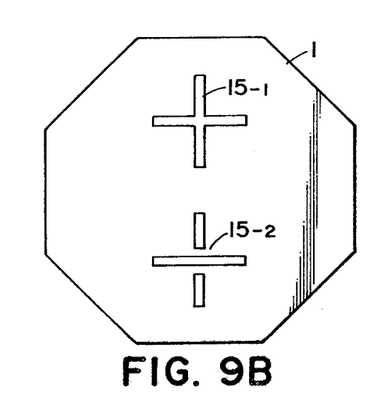
Figure 9C:
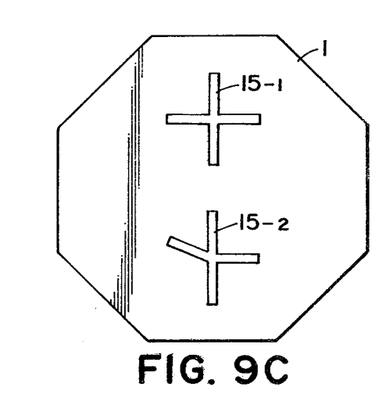

FIG. 9 shows a further embodiment of the tangible pattern member. The pattern in this embodiment is in the form of lines intersecting each other and includes two pattern portions 15-1 and 15-2. The portion 15-1 is a reference pattern portion and the other portion 15-2 is slightly different in form from the reference portion. The difference between the reference pattern portion 15-1 and the other portion 15-2 may be various as shown in FIGS. 9(a), (b) and (c). These patterns in the form of a cross are particularly useful for training the ability to read characters by fingers. L-shaped pattern, T-shaped pattern, Y-shaped pattern and X-shaped pattern may be used for the same purpose. The subject person is trained to discriminate the difference in form between the reference pattern portion 15-1 and the other pattern portion 15-2. By repeating such training, the subject person becomes able to easily read characters by fingers.

All of the tangible pattern members 1 shown in FIGS. 6-9 also can be rotated to let the subject person palpate the raised pattern in various directions.

While the invention has been particularly shown and described with reference to preferred embodiments thereof, it will be understood by those skilled in the art that the foregoing and other changes in form and details can be made therein without departing from the spirit and scope of the invention. For example, the tangible pattern member may have a recessed pattern portion in place of the raised pattern portion.

What we claim is:

1. Tactile sensibility testing equipment comprising:
   tangible means having a pattern formed thereon to be discriminated through tactile sensation;
   mounting means for mounting said tangible means; and
   means for rotatably supporting said mounting means, and for making said mounting means stationary at any one of a plurality of predetermined positions in its rotational direction.

2. Tactile sensibility testing equipment as set forth in claim 1, wherein said tangible means comprises a polygonal plate member.

3. Tactile sensibility testing equipment as set forth in claim 1, wherein said pattern is formed as a raised portion.

4. Tactile sensibility testing equipment as set forth in claim 3, wherein said raised portion has a rough surface.

5. Tactile sensibility testing equipment comprising:
   tangible means having a pattern formed thereon to be discriminated through tactile sensation;
   holding means for rotatably and detachably holding said tangible means and having a slot, wherein said slot serves to detach said tangible means from said holding means.

6. Tactile sensibility testing equipment as set forth in claim 5, wherein said slot comprises a hole passing through said holding means.

7. Tactile sensibility testing equipment as set forth in claim 5, wherein said pattern comprises a raised portion in a form of a ring, a portion of the ring is cut off.

8. Tactile sensibility testing equipment as set forth in claim 5, wherein said tangible means comprises a polygonal plate.

9. Tactile sensibility testing equipment comprising:
   tangible means having a pattern formed thereon to be discriminated through tactile sensation, said tangible means being an equilateral polygon;
   rotary holding means for rotatably holding said tangible means; and
   finger engaging means provided on said rotary holding means for allowing said rotary holding means to be rotated by a finger.

10. Tactile sensibility testing equipment as set forth in claim 9, wherein said finger engaging means has a plurality of finger holes arranged along a circle at regular intervals.

* * * * *

UNITED STATES PATENT AND TRADEMARK OFFICE
CERTIFICATE OF CORRECTION

PATENT NO. : 4,415,326          Page 1 of 2

DATED       : November 15, 1983

INVENTOR(S) : SABURO NAGATA, et al.

It is certified that error appears in the above-identified patent and that said Letters Patent is hereby corrected as shown below:

Abstract, line 2, delete "a";
         line 4, after "formed" insert --on--;
         line 10, delete "a".

Column 1, line 32, after "using" insert --such--;
         line 54, "ones" should read --one's--.

Column 2, line 3, "shows," should read --show,--;
         line 5, after "ring" insert a comma;
         line 5, after "with" delete --, the--;
         line 54, after "In" insert --the--.

Column 3, line 32, "test" should read --testing--;
         line 39, after "5.0mm" insert a period;
         line 54, "test" should read --testing--.

UNITED STATES PATENT AND TRADEMARK OFFICE
CERTIFICATE OF CORRECTION

PATENT NO. : 4,415,326  Page 2 of 2

DATED : November 15, 1983

INVENTOR(S) : SABURO NAGATA, et al.

It is certified that error appears in the above-identified patent and that said Letters Patent is hereby corrected as shown below:

Column 4, line 8, "let" should read --lets--;
         line 19, after "4" delete "surely";
         line 36, after "portion" insert --,--.

Column 5, line 6, after "1°" insert --,--;
         line 29, delete "regular";
         line 30, "triangle" should read --triangular--;

Column 6, line 39 (Claim 7), after "ring," insert --and wherein--.

Signed and Sealed this

Twenty-fourth Day of July 1984

[SEAL]

Attest:

GERALD J. MOSSINGHOFF

Attesting Officer  Commissioner of Patents and Trademarks